United States Patent
Miyazaki et al.

(10) Patent No.: US 6,573,000 B1
(45) Date of Patent: Jun. 3, 2003

(54) SEALED BATTERY SUITED TO PRODUCTION IN A SLIM RECTANGULAR FORM

(75) Inventors: Noriyuki Miyazaki, Sumoto (JP); Yasuhiro Yamauchi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/526,743

(22) Filed: Mar. 16, 2000

(30) Foreign Application Priority Data

Mar. 17, 1999 (JP) ............................................ 11-071865

(51) Int. Cl.[7] ................................................ H01M 2/08
(52) U.S. Cl. ....................... 429/185; 429/173; 429/176; 429/163
(58) Field of Search ................................ 429/173, 185, 429/176, 163

(56) References Cited

U.S. PATENT DOCUMENTS

| | | | | |
|---|---|---|---|---|
| 606,838 A | * | 7/1898 | Heins | 220/783 |
| 1,176,007 A | * | 3/1916 | Weber | 220/284 |
| 1,196,082 A | * | 8/1916 | Carnes | 220/797 |
| 1,277,724 A | * | 9/1918 | Hodgson | 220/256 |
| 3,802,597 A | * | 4/1974 | Miller | 220/256 |
| 4,547,236 A | * | 10/1985 | McCartney, Jr. | 156/244.13 |
| 5,561,001 A | * | 10/1996 | Gurtler et al. | 429/86 |
| 5,660,942 A | * | 8/1997 | Kothari | 429/177 |
| 6,017,649 A | * | 1/2000 | Pondo | 429/35 |
| 6,264,708 B1 | * | 7/2001 | Haraguchi et al. | 219/121.64 |

FOREIGN PATENT DOCUMENTS

JP             359175553 A    * 10/1984

* cited by examiner

Primary Examiner—Tom Dunn
Assistant Examiner—Colleen P. Cooke
(74) Attorney, Agent, or Firm—Armstrong, Westerman & Hattori, LLP

(57) ABSTRACT

A sealed battery has an opening in an external casing sealed using a sealing plate that is laser welded to external casing. The sealing plate has a drop formed near a perimeter of the external surface of the sealing plate so that the surface of the sealing plate is higher at a perimeter of the sealing plate than at a more central position. When the sealing plate is laser welded to the rim of the external casing, the presence of the drop means that there is no direct thermal conduction path from the welded parts to the center of the sealing plate, which reduces the dissipation of heat away from the welded parts. As a result, there is a reduction in the thermal stresses that occur at the welded parts, which means that the formation of cracks in the welded joins can be suppressed, even when a low-power laser beam is used.

11 Claims, 8 Drawing Sheets

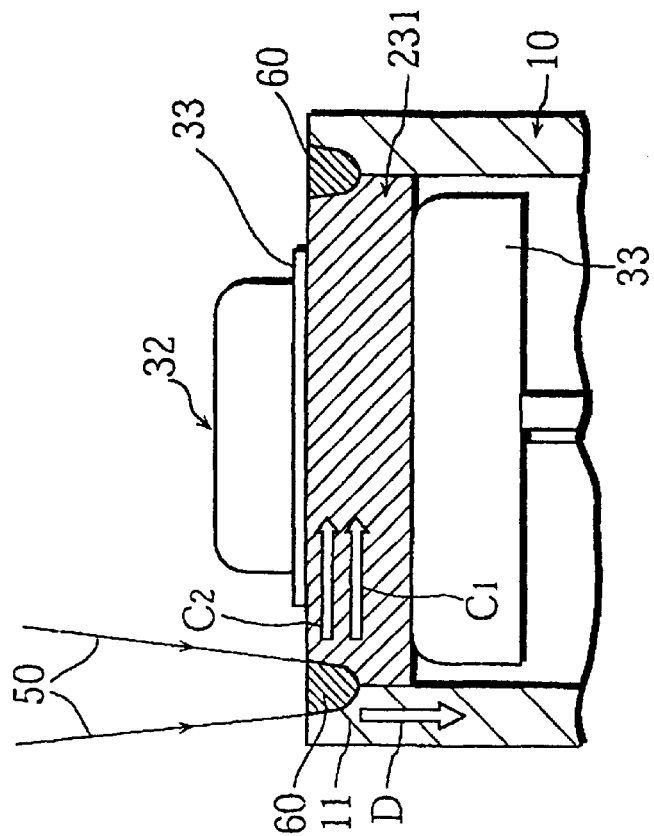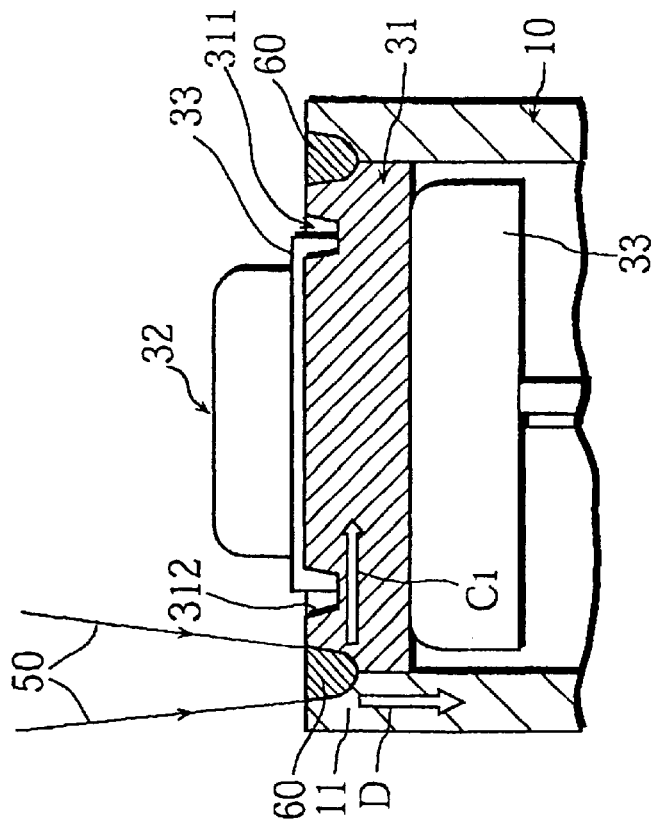

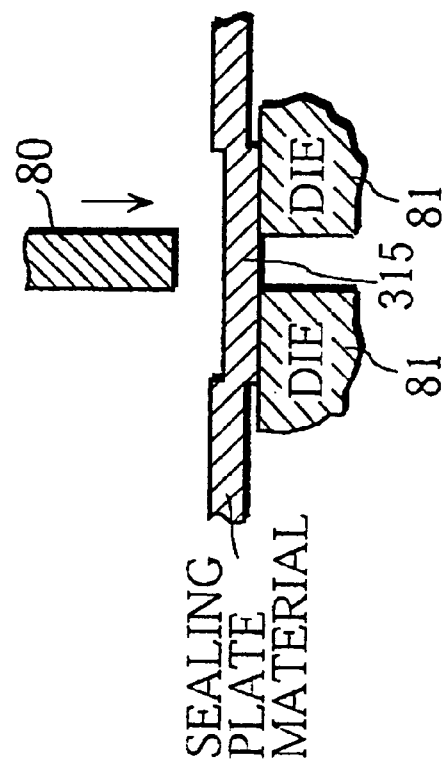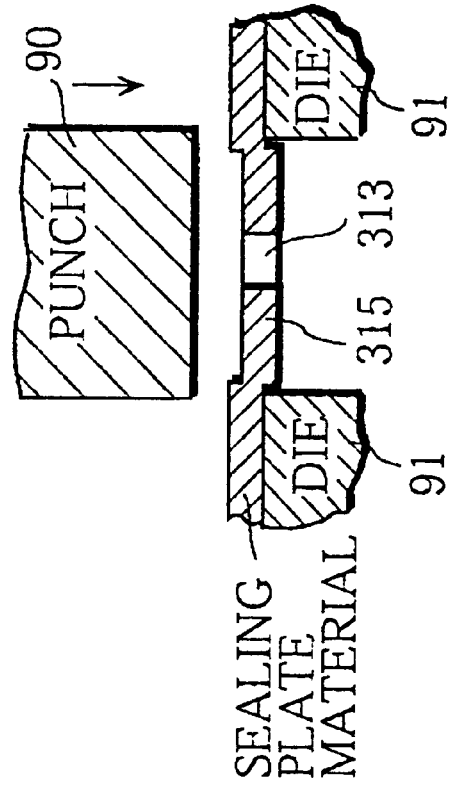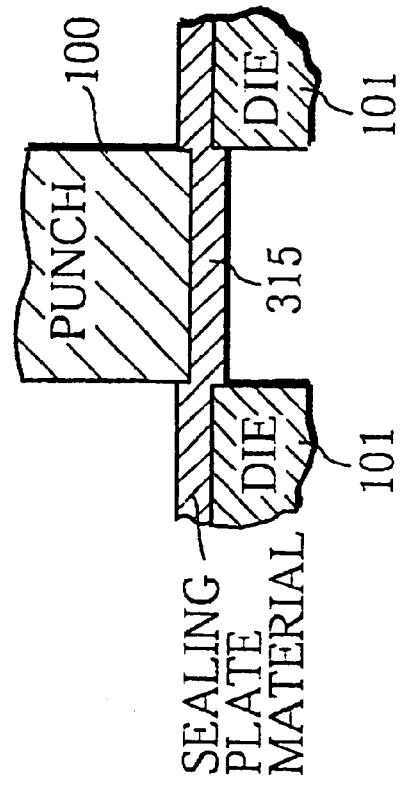

SEALED BATTERY SUITED TO PRODUCTION IN A SLIM RECTANGULAR FORM

This application is based on an application No. 11-71865 filed in Japan, the content of which is hereby incorporated by reference.

BACKGROUND OF THE INVENTION

(1) Field of the Invention

The present invention relates to sealed batteries that are sealed by laser welding a closure cap onto an external battery casing. In particular, the invention relates to rectangular sealed batteries.

(2) Related Art

In recent years, sealed batteries have been widely used as a power source in portable electronic appliances such as mobile telephones, audio-video devices, and computers. Representative sealed batteries include alkaline batteries, such as nickel-hydrogen storage batteries and nickel cadmium storage batteries, and lithium-ion batteries.

Both cylindrical and rectangular sealed batteries are widely used, with rectangular batteries being subject to special attention due to their superior space-saving potential when used in portable devices.

Sealed batteries are constructed as follows. A cylindrical external casing with a closed bottom is first formed by subjecting a metal plate to a deep drawing process. A generator element formed of a positive and a negative electrode is placed inside the external casing and a closure cap is attached to an opening in the casing. The edges of the closure cap and the casing are then hermetically sealed to prevent the leakage of electrolyte or gas.

Nickel-plated steel or stainless steel is often used to make external casing, though the current trend is toward the use of an aluminum alloy, such as an alloy produced by adding manganese to aluminum, to reduce to weight of the cell.

Mechanical caulking is often used to form the seal. Since this technique is difficult for rectangular sealed batteries, such batteries are often sealed using laser welding. Laser welding is performed by having a laser beam scan around the edge of the closure cap and the edge of the opening in the external casing. The reliability of a cell and its life are greatly affected by how well this welded seal can be made.

When a battery is sealed using laser welding, it is desirable to suppress the power of the laser beam at the welded parts. This is because the closure cap is normally connected to one of the electrode terminals via a gasket, which is less likely to be damaged during the laser welding process if the power of the laser beam is restricted. The use of a low-power laser also makes the manufacturing process more energy-efficient.

When a laser source with the same power rating is used, a lower power setting for the laser at the welding parts enables the scanning speed to be raised. Also, a welding device used to form welded seals on batteries will usually include only one laser source that is split into several beams using optical fibers to allow a plurality of batteries to be welded simultaneously. If the power setting for the laser is lowered, a higher number of batteries can be simultaneously welded without changing the output of the laser source, thereby raising the efficiency of the manufacturing process.

When the power setting of the laser used to seal the battery is lowered, however, there is the problem of cracks tending to appear along the lines welded by the laser. Parts of the battery incident to the laser melt to form molten pools of metal. As these pools cool, they are pulled by the thermal stresses that occur in the surrounding metal When the power of the laser beam is low, there are sudden drops in temperature in the molten pools, which cause large thermal stresses.

Cracking is especially common in the welded parts when the external battery casing and closure cap are formed from an aluminum alloy sheet. This is because aluminum alloy has a lower tensile strength than iron or stainless steel, and because the thermal conductivity of aluminum is high, meaning that the molten parts cool rapidly.

As one example, Japanese Laid-Open Patent Application No. S61-3664 teaches a technique for producing a closure cap 131 with a turned-up outer edge 132 that is laser welded to the edge of the opening in the external casing 10 (see FIG. 8). In this technique, there is no linear path for heat to flow from the molten pools to the center of the closure cap, which reduces the dissipation of heat from the molten pools and so reduces the thermal stresses that occur at the welded parts.

When the outer edge of the closure cap is turned up, however, the width of the upper surface of the battery (equivalent to the length in the horizontal plane in FIG. 8) is increased by twice the width of the turned-up outer edge 132, represented by twice the thickness of the closure cap 131 given as W2 in FIG. 8. When the width of the entire cell is of the order of several millimeters, as in a slim rectangular sealed battery, however, this makes this technique very difficult to use.

SUMMARY OF THE INVENTION

It is an object of the present invention to provide a technique that facilitates the manufacturing of slim sealed batteries by suppressing the incident power of a laser beam used to form a welded seal while preventing cracks from forming.

The present invention achieves the stated object by forming a drop in the outer surface of a sealing plate that is laser welded to an opening in the external casing of a sealed battery. The presence of the drop means that the outer surface is higher at the perimeter of the sealing plate than in a more central position.

When the perimeter of the sealing plate is laser welded to the rim of the opening, the drop in the sealing plate cuts off the linear thermal conduction path from the welded parts to the center of the sealing plate, thereby suppressing the dissipation of heat from the welded parts. This reduces the thermal stresses that occur at the welded parts, and means that there is less cracking, even when the power of the laser beam is reduced.

One method of forming a drop in the outer surface of the sealing plate is to form a channel in the surface of a material used to form the sealing plate. Another method is to apply pressure to all but the perimeter parts of the material forming the sealing plate. A sealing plate can be easily formed in this way by forging, for example.

The drop can be formed in the sealing plate very close to the outside edge. This means that the sealing plate can be made narrower than for the case where the outside edges of the sealing plate are turned up, as shown in FIG. 8. As a result, the present invention provides a slim, rectangular sealed battery that is narrower than conventional batteries, but does not suffer from cracking in the welded seal.

Cracking is especially a problem when the external casing and sealing plate are formed from an aluminum alloy. This means that the suppression of cracks by the present invention is especially noticeable for batteries formed of this material.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4A shows an external casing that is sealed using a sealing plate in which a drop is formed, while FIG. 4B shows an external casing that is sealed using a sealing plate with no drop;

FIGS. 7A to 7C show the procedure used to manufacture the sealing plate used in the second embodiment of the present invention.

DESCRIPTION OF THE PREFERRED EMBODIMENTS

First Embodiment
<Battery Construction>

Figure 1:
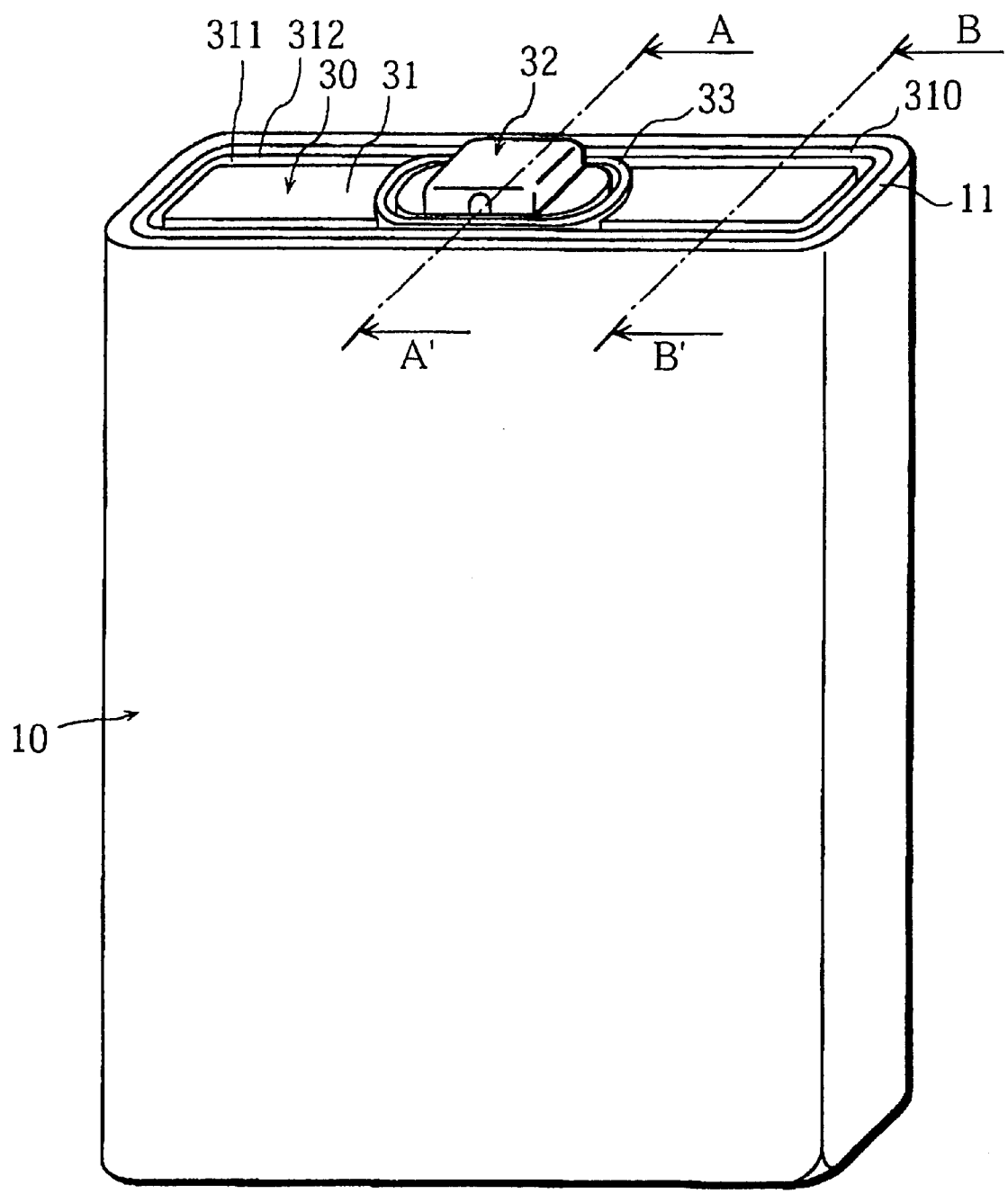
FIG. 1 is a perspective drawing showing a rectangular sealed battery that is a first embodiment of the present invention.
Figure 2B:
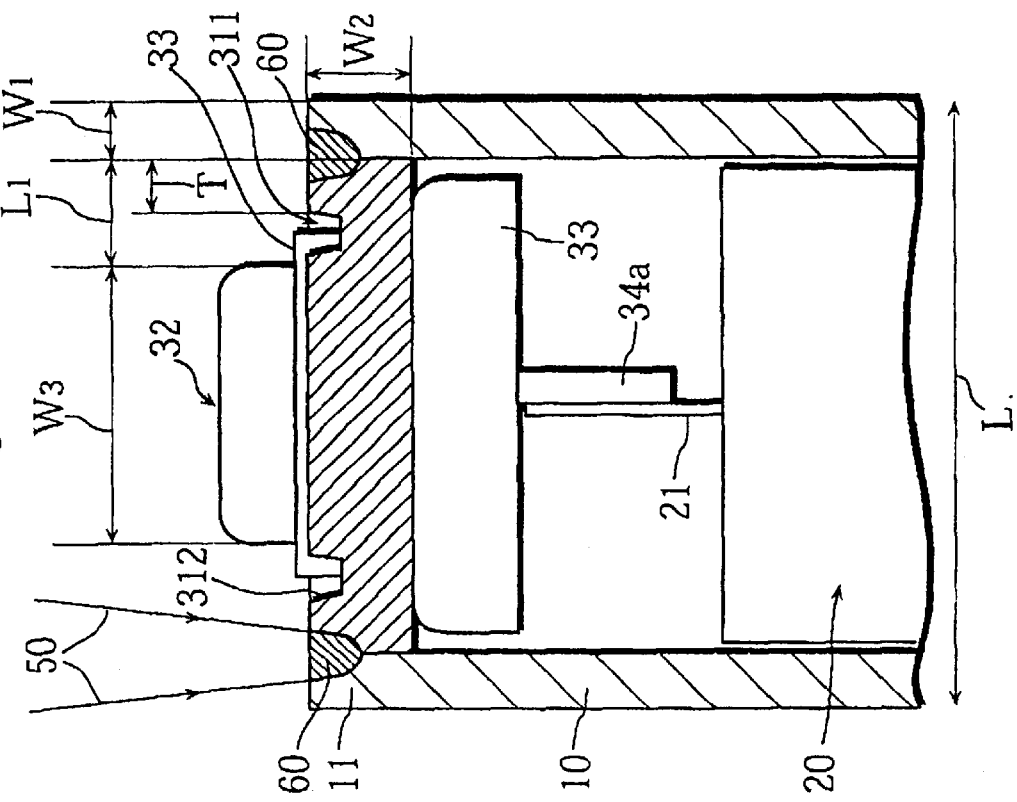
FIGS. 2A and 2B respectively show cross-sections of this battery taken along the lines A–A' and B–B' in FIG. 1.
Figure 2A:
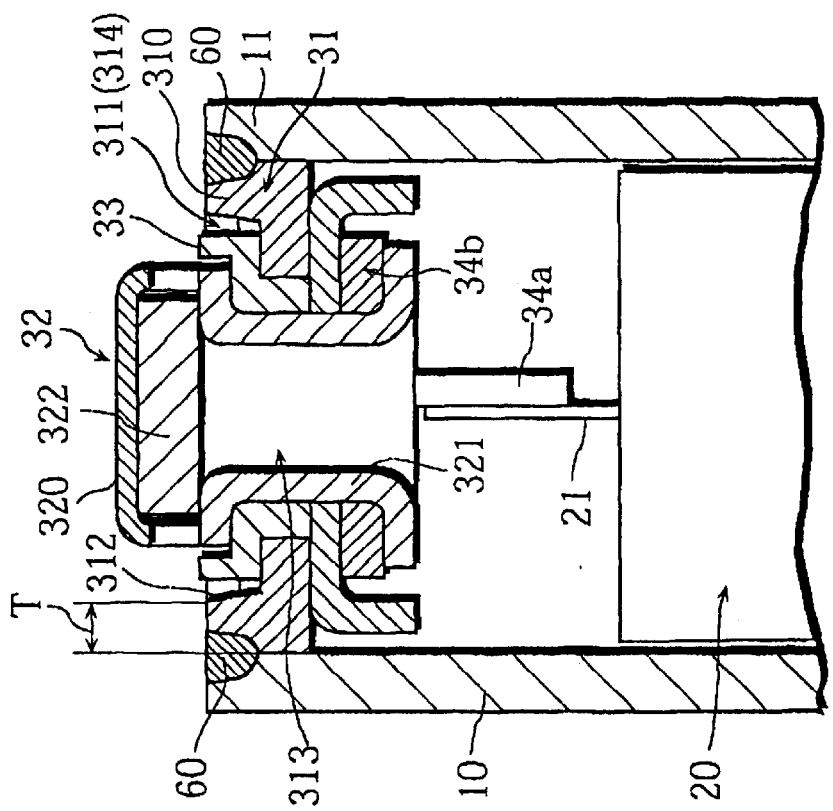

FIG. 1 is a perspective drawing showing a rectangular sealed battery that is a first embodiment of the present invention. FIGS. 2A and 2B respectively show cross-sections of this battery taken along the lines A–A' and B–B' in FIG. 1. The present rectangular sealed battery is a lithium-ion battery, and is constructed by inserting a generator element, including spirally wound electrodes (hereinafter, the electrode construction 20) that have been impregnated with electrolyte, into a rectangular external casing 10 with a closed bottom, before sealing the opening in the external casing 10 with closure construction 30.

The external casing 10 is formed from an Al—Mn type alloy plate in the shape of a rectangular cylinder with a closed bottom. The principal metal in the Al—Mn type alloy is aluminum to make the battery light, while the addition of manganese gives the casing a higher tensile strength than if aluminum were used alone.

As shown in FIG. 1, the closure construction 30 has a negative electrode terminal 32 that passes through a sealing plate 31 shaped so as to fit into the opening in the external casing 10, with a gasket 33 separating the sealing plate 31 and the negative electrode terminal 32.

The sealing plate 31 is made of a plate of the same Al—Mn alloy as the external casing 10 and in the same rectangular shape as the opening in the external casing 10. A channel 311 is formed around the edge of the outer surface of the sealing plate 31. An outer edge (hereinafter, "platform") 310 with a prescribed width is left on the outside of this channel 311, with it being this platform 310 that is laser welded to the edge 11 of the opening in the external casing 10 to seal the battery.

Of the side surfaces inside this channel 311, the surface that is closer to the outside of the battery is hereafter referred to as the drop 312.

To maximize the inner volume of the cell, the external casing 10 and sealing plate 31 should be made as thin as possible within a range where adequate strength can be maintained. The thickness of the external casing 10 is usually set at around 0.5 mm, while the thickness of the sealing plate 31 is usually set at around 0.8 mm. The sealing plate 31 is made slightly thicker than the external casing 10 to stop the sealing plate 31 becoming misshapen when the negative electrode terminal 32 is attached to the sealing plate 31.

The negative electrode terminal 32 is composed of a tip 320 that appears to be a flat plate and a cylindrical sleeve 321. The tip 320 is hollow, and a rubber member 322 is enclosed within the hollow space in the tip 320 to form a safety valve.

A through hole 313 into which the sleeve 321 of the negative electrode terminal 32 is inserted is provided in the center of the sealing plate 31. A recess 314 is formed around this through hole 313 in the external surface of the sealing plate 31 to accommodate the tip 320 of the negative electrode terminal 32.

When the battery described above is narrow, the tip 320 of the negative electrode terminal 32 will have almost the same width as the sealing plate 31. This means that the recess 314 will be very close to the channel 311 on both sides of the through hole 313, or, as shown in FIG. 2A, the recess 314 and channel 311 will be combined into a single depression.

A collector plate 34, which is composed of a protrusion 34a that protrudes toward the inside of the battery and a base 34b, is connected to the sleeve 321 of the negative electrode terminal 32. This negative electrode terminal 32 and collector plate 34 are insulated from the sealing plate 31 by a gasket 33, and are fixed to the sealing plate 31 by caulking the end of the sleeve 321.

The electrode construction 20 is formed by spirally winding a negative electrode plate and a positive electrode plate that have been laminated with a separator in-between. The resulting cylinder is then placed on its side and flattened to give a cylinder with an ovoid cross-section.

The negative electrode plate is produced by applying layered carbon (powdered graphite) onto a plate-like core, and is electrically connected to the protrusion 34a of the collector plate 34 via a lead plate. On the other hand, the positive electrode plate is formed by applying a positive electrode mixture composed of (a) a composite oxide including lithium. (such as lithium cobalt oxide) as the active material for the positive electrode and (b) a conductive agent (such as acetylene black) onto a plate-like core. The positive electrode plate is directly connected to the external casing 10 that also serves as the positive electrode terminal.

As one example, the electrolyte that is used to impregnate the electrode construction can be produced by dissolving an $LiPF_6$ solute in a mixed solvent composed of ethylene carbonate and dimethyl carbonate.

Note that while this is not illustrated in FIGS. 2A and 2B, An insulating sleeve composed of an insulating resin is provided between the electrode construction 20, and the sealing plate 31 to stop the electrode construction 20 and the sealing plate 31 coming into contact and to fix the electrode construction 20 at a specified position in the external casing 10.

<Manufacturing Method for the Battery>

The following describes the manufacturing method used to produce the rectangular sealed battery described above.

The external casing 10 can be made by subjecting a flat plate of an Al—Mn alloy to a deep drawing process to produce a rectangular cylinder with a closed bottom.

The sealing plate 31 can be made in the following way. A flat plate of an Al—Mn alloy is place under pressure perpendicular to its plane to produce the depressions that correspond to the channel 311 and the recess 314. The through hole 313 and the outside edge of the resulting sealing plate 31 are then stamped out to produce separate sealing plates 31.

The following describes a forging process that can be used to produce the sealing plate 31. This technique is called coining since it is also used to make coins.

Figure 3A:
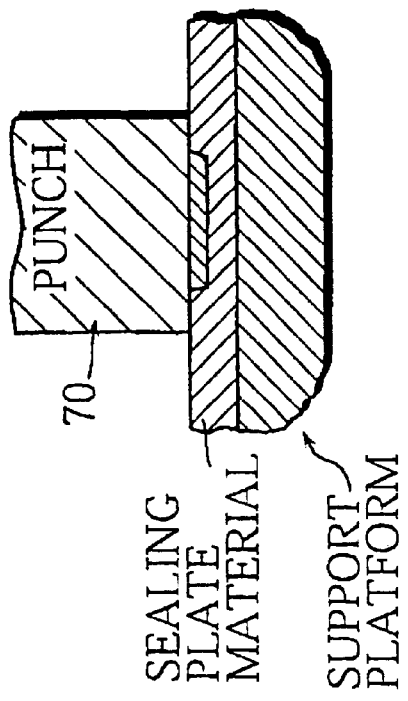
FIGS. 3A to 3D show the procedure used to manufacture the sealing plate used in the first embodiment of the present invention.
Figure 3B:
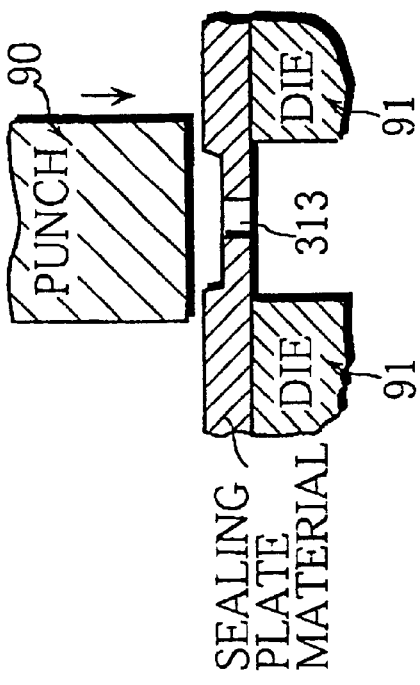
Figure 3C:
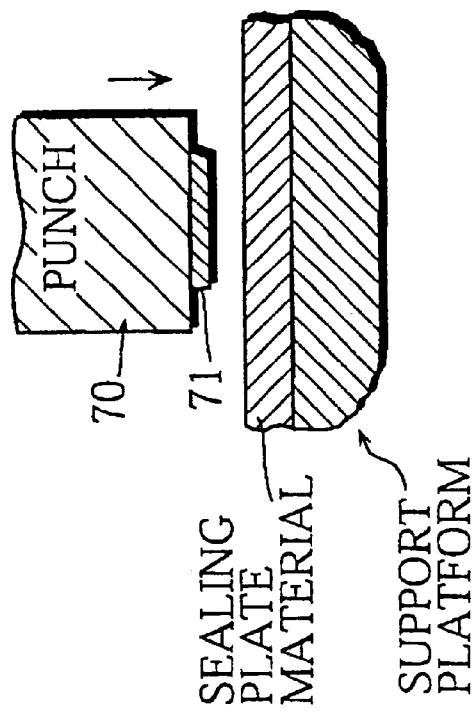

As shown in FIG. 3A, an alloy plate (used for making the sealing plate 31) is placed under pressure by a punch 70 that has a projection 71 whose shape corresponds to the channel 311 and the recess 314, resulting in the depressions corresponding to the channel 311 and the recess 314 being formed (see FIG. 3B). After this, a punch 81 and a die 81 are used to shear the alloy plate as shown in FIG. 3C to form the through hole 313. Finally, the punch 90 and the die 91 are used to shear the outer edge of the sealing plate 31 thereby completing its formation.

Note that while FIGS. 3A to 3D show the case where the channel 311 is formed in FIG. 3A before the outer edge of the sealing plate 31 is stamped out of the alloy plate, the channel 311 may be formed after the sealing plate 31 has been stamped out.

The procedure described above makes,it relatively easy to produce a sealing plate 31 where the distance T from the outer edge of the sealing plate 31 to the channel 311 is very small. This distance T corresponds to the platform 310, as shown in FIG. 2A.

The closure construction 30 is formed by fitting the gasket 33 and the negative electrode terminal 32 into the through hole 313 in the sealing plate 31, fitting the base 34b of the collector plate 34 into the sleeve 321 of the negative electrode terminal 32 (note that the cap of the tip 320 and the rubber member 322 are left off the negative electrode terminal 32 at this stage), and by caulking the end of the sleeve 321.

The electrode construction 20 is produced by laminating a belt-like negative electrode that has an attached lead plate 21, a belt-like separator and a belt-like positive electrode, before winding the laminated electrodes into a cylinder shape. The resulting cylinder is then flattened to give a cylinder with an ovoid cross-section.

The electrode construction 20 is inserted into the external casing 10 and the lead plate 21 is passed through the insulating sleeve and electrically connected to the collector plate 34.

Next, the insulating sleeve and the closure construction 30 are pressed into the opening in the external casing 10, and the platform 310 of the closure construction 30 and the edge 11 of the opening in the external casing 10 are welded together by having a laser beam scan around their edges.

An yttrium-aluminum-garnet (YAG) pulse laser (that emits light at 50 pps, for example) can be used as the laser source. As shown in FIG. 2B, the laser light 50 is focused onto the boundary of the platform 310 of the sealing plate 31 and the edge 11 of the opening, so that a small circular spot (with a diameter in the region of several hundred micrometers) is formed.

By shining the laser light in this way, the parts of the battery exposed to the laser light can be selectively melted, with the other materials (such as the gasket or the insulating sleeve) in the vicinity of the welded parts being subjected to little thermal damage.

The parts of the battery that are exposed to the laser beam, i.e., the platform 310 of the sealing plate 31 and the edge 11 of the opening in the external casing 10 melt to form the molten pools 60, which quickly harden.

When the laser source is emitting laser light, the laser pulse rate and the scanning speed are adjusted so that the spot formed by a laser pulse suitably overlaps the preceding pulse. An overlap in the ranges of 40–60% is usually used.

While shining the laser light 50, a jet of assist gas is supplied to the spot formed by the laser light 50. Having the metal melt in the presence of the assist gas in this way helps stop the melted parts oxidizing. Nitrogen gas is often used as the assist gas, though hydrogen, oxygen, or an inert gas such as argon may be used.

By having the laser light 50 scan in this way, the platform 310 of the sealing plate 31 and the edge 11 of the opening of the external casing 10 can be welded together around the entire length of their boundary, thereby sealing the battery.

After this, electrolyte is injected into the sleeve 321 of the negative electrode terminal 32, and finally the rubber member 322 and the cap of the tip 320 are attached.

<Effect of the Channel 311>

By forming a channel 311 around the outside edge of the sealing plate 31, a drop 312 is produced. This drop 312 is a region of the upper surface of the sealing plate 31 where the height of the sealing plate 31 decreases so as to be lower toward the center of the sealing plate 31 than at the edge.

During welding, the presence of the drop 312 suppresses the dissipation of heat from the molten pools 60 toward the center of the sealing plate 31. The inventors believe this is due to the following reasons.

FIG. 4A shows an external casing 10 that is sealed using a sealing plate 31 in which a drop 312 is formed. FIG. 4B shows an external casing 10 that is sealed using a sealing plate 231 in which no drop (channel) has been formed.

In either case, the heat dissipated from the molten pools 60 when the laser light 50 is shined travels mainly to the sealing plate (31 or 231), as shown by the white arrows C1 and C2, or to the external casing 10, as shown by the white arrow D. The greater amount of heat is dissipated toward the center of the sealing plate (31 or 231) in the direction shown by the arrows C1 and C2.

As shown in FIG. 4B, when no drop 312 is formed in the sealing plate 231, a linear thermal conduction path is present along the surface of the sealing plate 231 from the molten pools 60 to the center of the sealing plate 231, as shown by the white arrow C2. Conversely, when a drop 312 is formed in the sealing plate 31, as shown in FIG. 4A, there is no linear thermal conduction path along the surface, hence no white arrow C2 in FIG. 4A.

When compared to the case where no drop (channel) is formed, the formation of the drop 312 in the sealing plate 31 suppresses the dissipation of heat from the molten pools 60 to the center of the sealing plate 31 during laser welding. This slows the cooling of the molten pools 60 and so decreases the thermal stresses that occur at the molten pools 60. This means that cracking can be avoided in the welded seals, even when the power of the laser light is decreased.

By decreasing the power of the laser used to seal each battery, it is also possible to reduce the thermal damage to other materials, such as the gasket, that are positioned near the welded parts.

To sufficiently achieve the effects described above, the platform 310 and the channel 311 should be formed as described below.

The distance T between the outer edge of the sealing plate 31 and the channel 311 (which is to say, the width T of the platform 310) should be set as small as possible to suppress the dissipation of heat that occurs during the laser welding. However, if the distance T is too narrow, the molten pools 60 will not be properly formed, making it impossible to obtain a sufficiently strong welded join. Accordingly, the distance T should be set taking both these needs into account.

The width and depth of the channel 311 should be large to suppress the dissipation of heat that occurs during the laser welding. However, setting the depth of the channel 311 at a low value enables the sealing plate 31 to maintain the necessary strength. The value should therefore be set within a range that takes both concerns into account.

In the case of a slim, rectangular lithium-ion battery with an aluminum external casing, it is appropriate to set the thickness of the sealing plate at around 0.8 mm and the spot diameter of the laser beam using for the welding at around 0.8 mm. In this case, molten pools 60 will be formed with a depth of around 0.15–0.2 mm.

In accordance with the above settings, the distance T should preferably be around 0.4–0.45 mm, the depth of the channel 311 should preferably be at least 0.2 mm (i.e., around 0.3mm), and the width of the opening in the external casing should preferably be around 0.4 mm.

As described in detail later, the distance T between the outer edge of the sealing plate 31 and the channel 311 can be set considerably smaller-than the thickness (before machining) of the sealing plate 31 in the present embodiment. This makes it possible to reduce the width of the sealing plate 31, thereby facilitating the manufacturing of a slim, rectangular sealed battery with a width of 6 mm or less.

Second Embodiment

Figure 5:
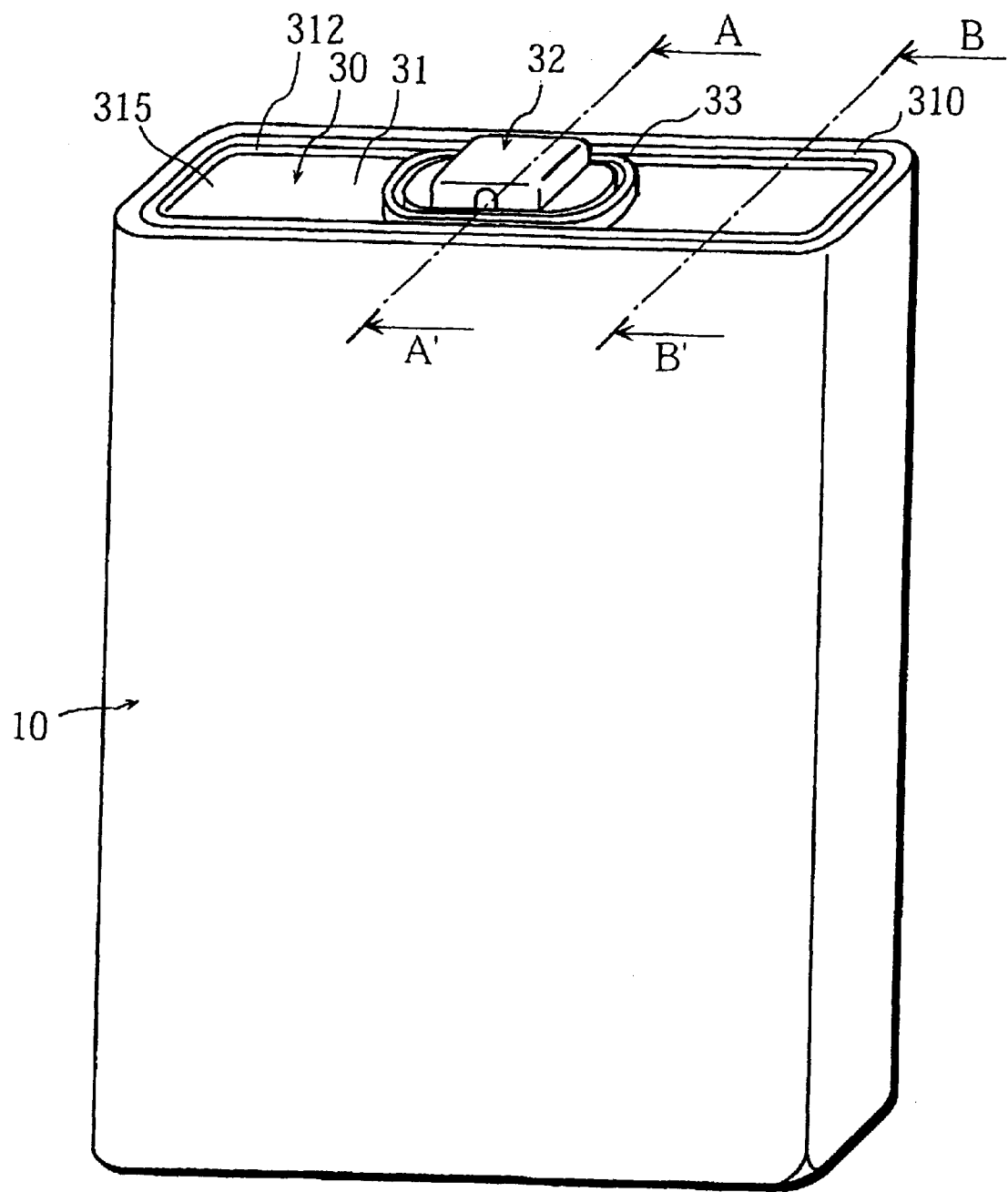
FIG. 5 is a perspective drawing showing a rectangular sealed battery that is a second embodiment of the present invention.
Figure 6A:
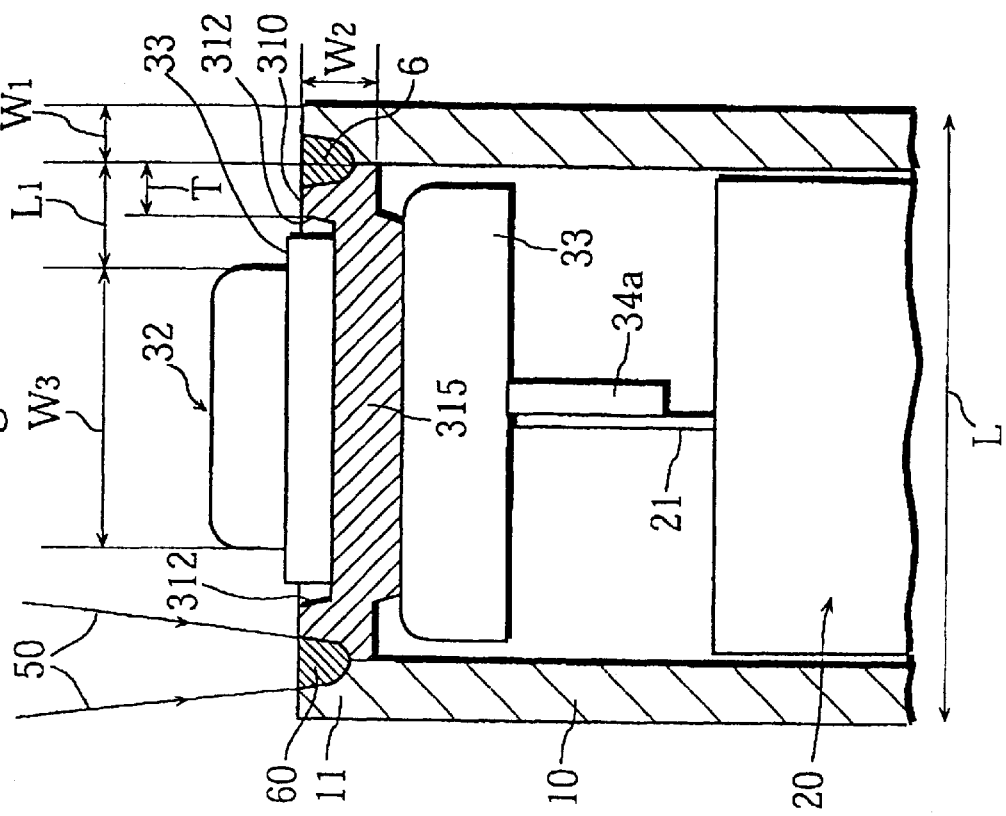
FIGS. 6A and 6B respectively show cross-sections of this battery taken along the lines A–A' and B–B' in FIG. 6.
Figure 6B:
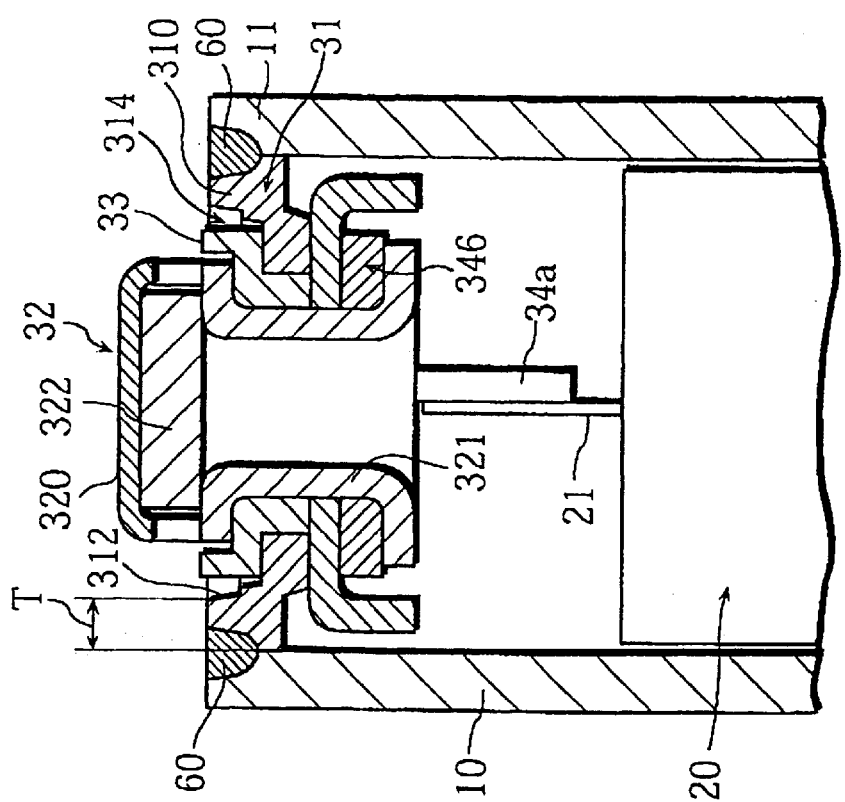

FIG. 5 is a perspective drawing showing a rectangular sealed battery that is a second embodiment of the present invention. FIGS. 6A and 6B respectively show cross-sections of this battery taken along the lines A–A' and B–B' in FIG. 2.

Components in FIGS. 5, 6A and 6B that have the same reference numerals as components mentioned in the first embodiment are the same as these components.

The battery described in this second embodiment has the same construction as the battery described in the first embodiment, with the only difference being in the form of the sealing plate 31. As before, the sealing plate 31 of the second embodiment has a drop 312 in the outside surface of the sealing plate 31, the drop 312 being a sloping surface where the height of the outside-surface of the sealing plate 31 falls so as to be lower toward the inside of the sealing plate 31 than at the outside edge. In the first embodiment, the channel 311 is formed around the edge of the sealing plate 31 to produce this drop 312. In the second embodiment, however, the entire center part 315 of the sealing plate 31 is depressed, with the drop 312 marking the boundary between this lowered center part 315 and the platform 310 around the edge of the sealing plate 31.

With the exception of the sealing plate 31, the battery of this second embodiment is manufactured according to the same manufacturing method as the battery of the first embodiment.

The sealing plate 31 of the present embodiment is made from a flat Al—Mn alloy plate. Pressure is applied to the plane of this plate to produce a depression across almost the entire plate corresponding to the center part 315. The outer edge of the sealing plate 31 and the through hole 313 are stamped out to produce individual sealing plates 31.

In more detail, a forging process (coining) is used to produce the depression corresponding to the recess 314.

Next, as shown in FIG. 7A, a punch 100 and die 101 whose size corresponds to the center part 315 are moved perpendicular to the plane of the sealing plate 31 at a position corresponding to the center part 315, thereby forming the depression in the center part 315.

Figure 3D:
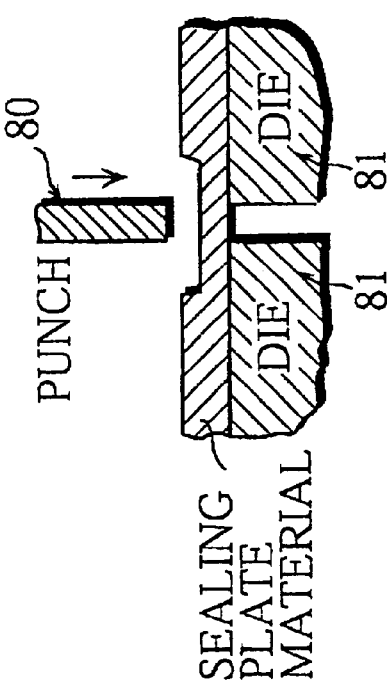

The sealing plate 31 is thereafter processed in the same way as was described for FIGS. 3C and 3D. After this, a punch 81 and a die 81 are used to shear the alloy plate as shown in FIG. 7B to form the through hole 313. Finally, as shown in FIG. 7C, the punch 90 and the die 91 are used to shear the outer edge of the sealing plate 231, thereby completing its formation.

While the illustrated example has the outer edge of the sealing plate 231 being stamped out in FIG. 7C after the center part 315 has been formed in FIG. 7A, the sealing plate 231 may be produced by performing these processes in the opposite order.

The procedure described above makes it relatively easy to produce a sealing plate 31 where the width T of the platform 310 is very small.

As with the sealing plate 31 described in the first embodiment, the sealing plate 231 has a drop 312 formed around its outer edge. This means that during laser welding, there is less dissipation of heat from the molten pools 60 to the center of the sealing plate 31, so that cracking can be suppressed even when a lower power laser beam is used.

To sufficiently achieve the effects described above, the platform 310 and the drop 312 should be formed as described below. As in the first embodiment, the distance T from the outer edge of the sealing plate 231 to the drop 312 should be set as small as possible to suppress the dissipation of heat that occurs during the laser welding. For the same reason, the change in the height of the sealing plate 231 due to the presence of the drop 312 should be set as high as possible. As before, when the thickness of the sealing plate is around 0.8 mm and the spot diameter of the laser beam using for the welding is around 0.8 mm, the distance T should preferably be around 0.4–0.45 mm, and the height of the drop 312 should preferably be around 0.2 mm (i.e., around 0.3mm).

As in the first embodiment, making the distance T from the outer edge of the sealing plate 31 to the drop 312 smaller than the thickness of the sealing plate 231 allows the sealing plate 231 to be made narrower, thereby facilitating the production of slim, rectangular sealed batteries whose width is 6 mm or less.

COMPARATIVE EXAMPLE 1

Figure 8:
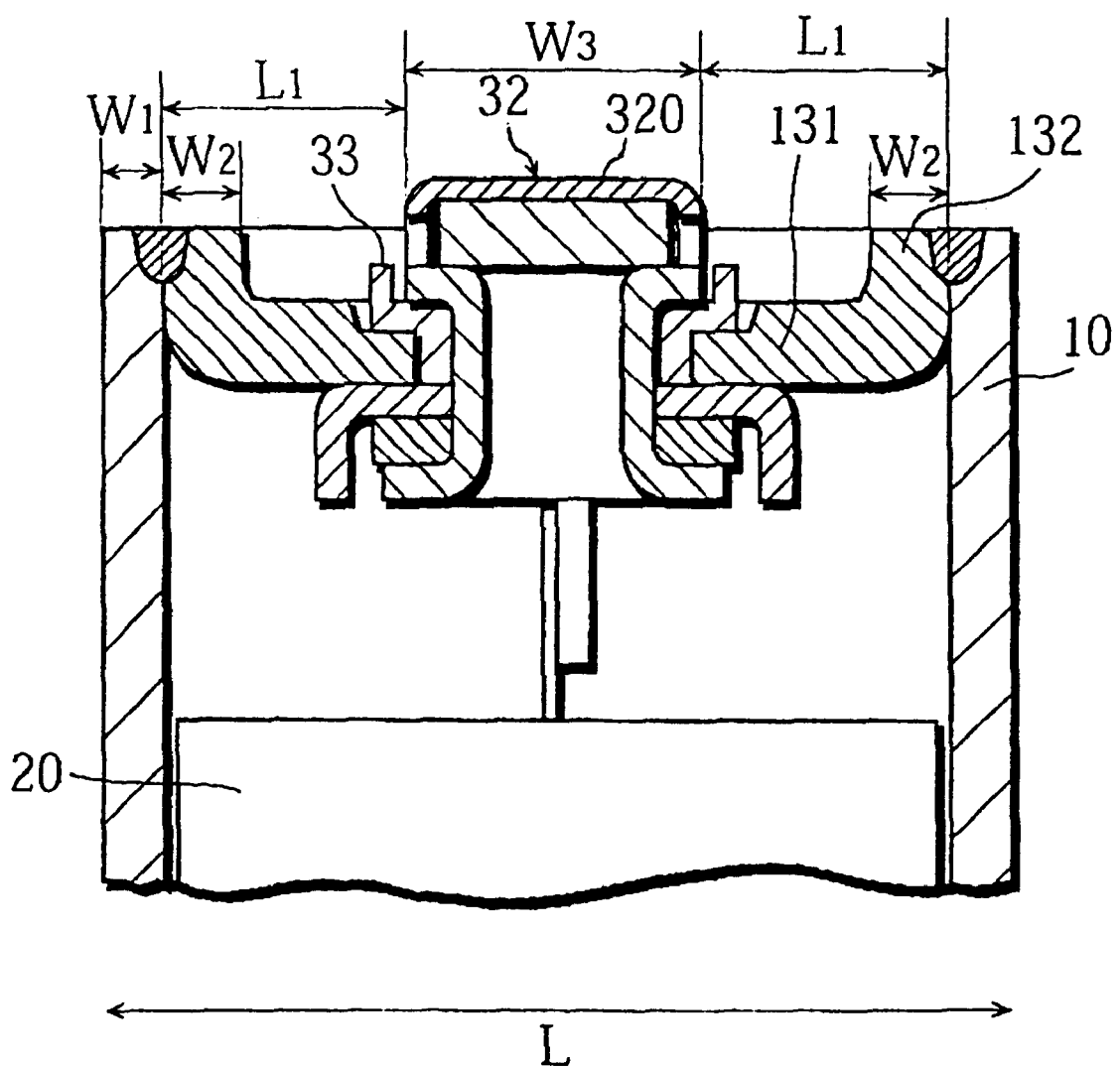
FIG. 8 shows a cross-section of a rectangular sealed battery that is a comparative example, taken across the battery.

FIG. 8 shows a cross-section of a rectangular sealed battery that will be used as a first comparative example. In FIG. 8, components that are the same as the components of the battery shown in FIGS. 1 and 2 have been given the same reference numerals as before.

The battery of this comparative example 1 uses a sealing plate 131 with a turned-up outer edge 132. This turned-up edge 132 is laser welded to the edge 11 of the opening in the external casing 10. Apart from this point, however, the battery of this comparative example 1 is the same as the batteries described as embodiments of the present invention.

The turned-up edge 132 of the sealing plate 131 can be formed by a drawing process.

<Regarding the Width of the Battery>

The following compares the widths of the batteries of the first embodiment, the second embodiment, and the comparative example.

In FIGS. 2B, 6B and 8, the distance L1 is measured from the edge of the tip 320 of the negative electrode terminal 32 to the edge of the sealing plate.

In comparative example 1, a turned-up edge 132 whose width is equal to the plate thickness W2 of the sealing plate 131 is present to the side of the tip 320. This means that the distance L1 needs to be set greater than the plate thickness W2, giving the inequality L1>W2.

On the other hand, while the batteries of the first and second embodiments require the distance L1 to be set greater than the distance T, they do not require the distance L1 to be set greater than the plate thickness W2. Since the distance T can be set considerably smaller than the plate thickness W2 of the sealing plate 131, the distance L1 can be made that much smaller in the batteries of the first and second embodiments relative to the battery of the comparative example 1.

When, for example, the plate thickness W2 of the sealing plate is 0.8 mm and the distance T is 0.4 mm, the distance L1 can be made 0.4 mm smaller in the batteries of the first and second embodiments than in the battery of the comparative example.

This means that the first and second embodiments can be used for batteries that are 0.8 mm narrower than the batteries of the comparative example 1.

Note that while it is possible to shave the turn-up edge 132 of the comparative example 1 to decrease its width and hence decrease the width of the battery, it is believed that such processes will complicate the manufacturing process. The manufacturing method of the first and second embodiments is therefore advantageous.

Based on these considerations, the minimum battery width was estimated as follows for the comparative example and for the first and second embodiments.

The actual implementation of all of the above batteries requires the width W3 of the tip 320 to be at least 3.7 mm or so, the thickness W1 of the external casing at the edge of the opening to be at least 0.4 mm or so, and the plate thickness of the sealing plate to be at least 0.8 mm or so.

In the comparative example, the minimum thickness L of the battery can be estimated as (3.7+0.4*2+0.8*2)=6.1 mm or thereabouts.

In the first and second embodiments, the distance T can be set at 0.4 mm, in which case the minimum value L for the width of the battery can be estimated as (3.7+0.4*2+0.4*2)=5.3 mm or thereabouts.

The thickness W1 of the external casing at the edge of the opening, the width W3, and the distance T can all be slightly reduced, which reduces the width of the battery to 4.9 mm or thereabouts.

ACTUAL EXAMPLE 1

Based on the first embodiment, rectangular sealed batteries were manufactured using a 0.8 mm-thick plate of an aluminum alloy as the sealing plate.

The size of the batteries was set at height 20 mm, length 30 mm, and width 8 mm. The distance T between the outer edge of the sealing plate and the channel was set at 0.4mm, the depth of the channel at 0.3 mm, and the width of the channel at the top of the channel at 0.4 mm.

COMPARATIVE EXAMPLE 2

Rectangular sealed batteries including a sealing plate were manufactured in the same way as actual example 1, except that no channel 311 was formed in the sealing plate.

From experimentation, it was found that the actual example 1 could be laser welded with 75% of the laser power used for the comparative example 2.

Experiment 1

Testing for Air Leaks

A large number of sealing plates were prepared for the actual example 1 and the comparative example 2. These sealing plates were each attached onto an empty external casing and then sealed using laser welding.

After this, air was introduced through the through hole in the sealing plate 31 to raise the internal pressure to $4kg/cm^2$. The occurrence of leaks at the welded seals was then investigated.

The results of this experiment are shown in Table 1.

TABLE 1

|  | Actual Example 1 | Comparative Example 2 |
|---|---|---|
| Proportion of batteries with leaks | 0.5–0.8% | 3.5–4.8% |

From the Table 1, it can be seen that fewer leaks occur for the actual example 1 than for the comparative example 2. This shows that cracking in the welded seal can be suppressed even when a low-power laser beam is used for the laser welding. This effect is due to the formation of the channel around the outer edge of the outer surface of the sealing plate, as described in the first embodiment.

Experiment 2

Investigation into Storage Characteristics

The batteries of the actual example 1 and the comparative example 2 were stored at a temperature of 70° C. and a humidity of 90%. Changes in the mass of the batteries after ten days and after twenty days were measured.

The results of this experiment are shown in Table 2.

TABLE 2

|  |  | Actual Example 1 | Comparative Example 2 |
|---|---|---|---|
| Decrease in mass | After 10 days | 3–12 mg | 10–18 mg |
|  | After 20 days | 15–28 mg | 35–65 mg |

From Table 2, it can be seen that the batteries of the actual example 1 suffered from a lower decrease in mass than the batteries of the comparative example 2. This is thought to be due to the following reason. A large amount of heat is dissipated in the comparative example 2 during the laser welding, which causes the gasket of the negative electrode terminal to lose its elasticity. This weakens the airtight seal.

<Other Considerations>

As explained above, the present invention describes a method for providing a channel-like depression in the outer surface of a sealing plate that is laser welded to an opening in an external casing of a sealed battery. This depression is formed by applying perpendicular pressure to the sealing plate and changing the position at which the pressure is applied. By forming a drop around the outer edge of the sealing plate in this way, the formation of cracks in the welded seal can be suppressed, even when a low-power laser is used to seal the battery. This improves the yield when manufacturing sealed batteries, as well as facilitating the manufacturing process.

Since cracks are easily formed when manufacturing batteries from a sealing plate and external casing made of aluminum alloy, the effect of the present invention is particularly significant. While the embodiments describe the case where the external casing and the sealing plate are formed from an aluminum alloy, the present invention can also be applied to batteries made from other materials, such as stainless steel.

The present invention is particularly effective for slim, rectangular sealed batteries, such at the battery described in the above embodiments. It should be clear, however, that the present invention can also be applied to cylindrical sealed batteries.

Finally, the above embodiments describe the case when the present invention is used for a lithium secondary cell, since the present invention is particularly effective for such batteries. The invention can be also applied to other types of secondary cell, such as nickel hydrogen batteries, or to primary cells.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A sealing plate that is laser welded to an opening in an external case of a battery to seal the battery, characterized in that:
   the sealing plate has a drop formed in a surface that becomes an outer surface when the sealing plate is welded to the external case,
   the drop being positioned near a perimeter of the outer surface, making the outer surface higher at the perimeter than at a position closer to a center of the sealing plate.

2. A sealing plate according to claim 1,
   wherein a channel is formed in the outer surface, with the drop being a side surface of the channel.

3. A sealing plate according to claim 1,
   wherein the outer surface is lower in a central region, which is positioned on an inside of the drop, than at the perimeter.

4. A sealing plate according to claim 1,
   wherein a distance from the perimeter to the drop is less than a thickness of a material used to form the sealing plate.

5. A sealing plate according to claim 1,
   wherein a difference in the height of the outer surface caused by the drop is at least 0.2 mm but less than a thickness of a material used to form the sealing plate.

6. A sealing plate according to any of claims 1 to 5,
   wherein the sealing plate is made of an alloy whose main constituent is aluminum.

7. A sealed battery, comprising:
   an external casing shaped as a closed-bottom cylinder with an opening;
   a set of electrodes housed within the external casing; and
   a sealing plate, as recited in any of claims 1 to 5, that is attached to the opening by laser welding to seal the sealed battery.

8. A sealed battery according to claim 7, further comprising:
   a negative electrode terminal that passes through a hole provided in a central part of the sealing plate; and
   an insulator provided between the negative electrode terminal and the sealing plate.

9. A sealed battery according to claim 7,
   wherein the sealed battery is rectangular.

10. A sealed battery according to claim 9,
    wherein the sealed battery is no more than 6 mm wide.

11. A sealed battery, comprising
    an external casing shaped as a closed-bottom cylinder with an opening and made of an alloy whose main constituent is aluminum;
    a set of electrodes housed within the external casing; and
    a sealing plate, as recited in claim 6, that is attached to the opening by laser welding to seal the sealed battery.

* * * * *